United States Patent [19]

Nakai

[11] Patent Number: 5,514,731
[45] Date of Patent: May 7, 1996

[54] ANTIFOULING PAINT

[75] Inventor: Yoshito Nakai, Yamaguchi, Japan

[73] Assignee: Hayashikane Paint Co., Ltd., Yamaguchi, Japan

[21] Appl. No.: 626,108

[22] Filed: Dec. 14, 1990

Related U.S. Application Data

[63] Continuation-in-part of Ser. No. 623,626, Dec. 6, 1990, abandoned.

[51] Int. Cl.[6] .................................................. C08L 83/12
[52] U.S. Cl. .................... 523/122; 524/175; 524/178; 524/218; 524/440; 524/435; 524/100; 524/265; 524/269; 535/100; 535/101; 535/106
[58] Field of Search ........................ 525/477, 100; 524/265, 269, 175, 178, 218, 440, 435, 100; 523/122

[56] References Cited

U.S. PATENT DOCUMENTS

| | | | |
|---|---|---|---|
| 4,146,511 | 3/1979 | Moriya et al. | 524/265 |
| 4,535,113 | 8/1985 | Foster et al. | 524/262 |
| 4,898,895 | 2/1990 | Masuoka et al. | 523/122 |

FOREIGN PATENT DOCUMENTS

| | | | |
|---|---|---|---|
| 52-066559 | 6/1977 | Japan | 525/100 |

*Primary Examiner*—Ralph H. Dean
*Attorney, Agent, or Firm*—Millen, White, Zelano, & Branigan

[57] ABSTRACT

This invention discloses an antifouling paint which can retain antifouling properties over a long period of time comprising:

(A) 100 parts by weight of a film forming resin, and
(B) 1–50 parts by weight of a chain organopolysiloxane containing oxyalkylene groups and having an HLB of 3–12.

16 Claims, No Drawings

ANTIFOULING PAINT

CROSS-REFERENCE TO RELATED APPLICATION

This application is a continuation-in-part of application Ser. No. 623,626, filed Dec. 6, 1990, now abandoned.

FIELD OF THE INVENTION

This invention concerns an antifouling paint for application to underwater or marine structures including fishing nets such as stationary nets and culture nets, ocean tanks and bridge beams, various types of marine equipment, and ships, and in particular concerns an antifouling paint suitable-for application to fishing nets.

BACKGROUND OF THE INVENTION

Fishing nets and marine stuructures, marine equipment and ships are exposed to long periods of use in water and especially sea water. As a result of this, marine organisms tend to adhere to and proliferate on parts in contact with sea water, and the function of said fishing nets and other equipment may be impaired.

Insofar as concerns fishing nets, stationary nets and culture nets are left in sea water for very long periods of time. Adhesion and proliferation of marine organisms on these nets is particularly serious, so the nets must be replaced frequently and high economic losses are sustained. It is therefore essential to paint these fishing nets with an antifouling paint which makes it difficult for marine organisms to adhere to them.

The marine organisms referred to here which cause such a problem include animal species such as barnacles, hydrozoa, slimy sea squirts, sponges, small polyzoans, skeleton shrimps, hairy polyzoans, sea squirts, serpulas, sea anemones and oysters, and plant species such as sea lettuces, ceramium and green laver. It is also necessary to prevent the adhesion of organic waste or slime originating from the excreta or carcasses of these animal and plant species.

Antifouling paints with addition of silicone oils have been used for this purpose, conventional examples of these silicone oils being dimethyl silicone oil and phenylmodified silicone oil which has improved compatibility with the resin component and chemical components of the paint. However, although these conventional silicone oils conferred satisfactory water repellent peoperties on the paint, their antifouling properties were not so good, and an effective antifouling paint could not therefore be obtained. In conventional antifouling paints, moreover, it was unclear what kind of structure and properties the added silicone oil should have in order to confer good antifouling properties on the resin, and in particular acrylic resin, which is the main component of the paint film. A satisfactory antifouling paint therefore had still not been proposed.

The inventors of the present invention carried out an extensive investigation of the factors affecting the performance of antifouling paints with added silicone oil, and made the following observations:

(1) An organopolysiloxane with suitable coordination power to support the acrylic or other film-forming resin is required.

(2) An organopolysiloxane with intermediate hydrophilic properties with respect to the film-forming resin is most desirable.

(3) If a film-forming resin and liquid resin are used in conjuction, it is desirable that this organopolysiloxane has no interaction with the groups responsible for the cohesive force of the resins.

The inventor of this invention then found that excellent results were obtained by the addition of polyether modified silicone oils with a specific hydrophilic lipophilic balance (HLB).

SUMMARY OF THE INVENTION

One object of this invention is therefore to provide an antifouling paint with added silicone oil which retains high antifouling properties over a long period of time.

A further object of this invention is to provide an antifouling paint which is particularly effective when applied to fishing nets.

The above objects are attained by an antifouling paint comprising:

(A) 100 parts by weight of a film-forming resin, and
(B) 1–50 parts by weight of a chain organopolysiloxane containing oxyalkylene groups and having an HLB of 3–12.

The antifouling paint of this invention exhibits equivalent or better antifouling properties than conventional antifouling paints even if the blending propotion of antifouling agent is greatly reduced, and also retains these properties over a long period of time. It is therefore an effective paint for underwater marine uses, and particularly for application to fishing nets.

DETAILED DESCRIPTION OF THE INVENTION

The above mentioned film-forming resin which is component (A) of this invention may be an "insoluble matrix type" resin or an ordinary organic polymer resin for use in antifouling paint. Exanples of such insoluble matrix type resins are styrene-butadiene or vinyl chloride resins. Examples of organic polymer resins are polymers and copolymers of acrylic or methacrylic esters, styrene, vinyl acetate, monoethylene type unsaturated compounds such as ethylene and propylene, polyurethane, polyester and epoxy resins, urea resins, alkyd resins, and derivatives of these resins. There is no particular restriction on the molecular weight of the resin provided that it is high enough to effectively maintain strength.

Of these resins, acrylic resins are particularly effecive as component (A).

The before mentioned chain organopolysiloxane with oxyalkylene groups which is component (B) of this invention is normally a polyether modified silicone oil, but it must in particular have a hydrophilic lipophilic balance (referred to hereafter as HLB) in the range 3–12.

This component (B) may typically be an organopolysiloxane represented by the following general formula:

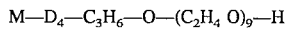

M is a monofunctional siloxane unit wherein one oxygen atom is bonded to a silicone atom, and is represented by the general formula:

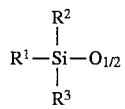

where $R^1$, $R^2$ and $R^3$ are alkyl groups, and usually methyl groups.

D is a bifunctional siloxane unit wherein 2 oxygen atoms are bonded to a silicon atom, and is represented by the general formula:

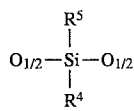

where $R^4$ and $R^5$ are alkyl, alkenyl or aryl groups, and are usually chosen from methyl, vinyl and phenyl.

As described above, HLB is the hydrophilic lipophilic balance. The HLB of high molecular weight compounds is generally given by the following formula:

$$HLB = \frac{\text{Weight \% of polyoxyethylene in high molecular weight compound}}{5}$$

The hydrophilic properties of the compound are therefore greater for higher values of HLB.

As stated, the HLB of component (B) in this invention must lie within the range 3–12, but preferably within the range 4–11, and more perferably within the range 9–11. If HLB is less than 3, antifouling properties deteriorate, while if it is greater than 12, hydrophilic properties are too marked and the antifouling effect cannot be retained over a long period of time.

In addition to said components (A) and (B) of the antifouling paint of this invention, an liquid resin such as polybutene resin may also be included as a component (C), which confers adhesive properties on the paint (referred to hereafter as adhesive resin), and also functions to increase the pliancy of the film. Component (C) may for example be a random copolymer obtained by reacting, at low temperature in the presence of a catalyst, the isobutylene and normal butylene in the butane-butylene distillate produced by decomposition of naphtha. The blending proportion of component (C) may be adjusted suitably in order to provide film strength and retention of antifouling properties.

In particular, if the antifouling paint of this invention is used on underwater structures to prevent adhesion and proliferation of marine organisms, it is desirable that in addition to components (A), (B) and (C), it also contains an antifouling agent (D).

This antifouling agent may be a disinfectant or a repellent. Said antifouling agent may be for example be an organotin compound, organozinc compound, halogenated aromatic compound, sulfamide type compound, or flakes or a fine powder of copper or cuprous oxide.

A photosynthesis inhibitor such as a triazine type compound may also be blended with the antifouling paint of this invention as a further component (E).

Conventional plasticizers, anti-drip agents, coloring pigments or body pigments known in the prior art may also be blended with the antifouling paint of this invention.

When incorporating (A), (B) and other components of this invention into the paint, they may first be diluted with an organic solvent such as toluene or xylene.

EXAMPLES

We shall explain this invention in more detail with reference to specific examples, but it should be understood that the invention is in no way limited by them.

The figures for blending proportions given in the tables are proportions by weight.

Examples 1–5

Antifouling paints were prepared by blending and thoroughly dispersing the specified components by means of a Labo Mixer so as to obtain the compositions shown in Table 1.

The paints so prepared were applied to 35 cm×45 cm fishing nets (Taito SeiKo K.K. "Hizex" (trade name), 400 denier, 60 strand, 60 mm mesh). After allowing the paint to harden, the nets were suspended off the coast of Shimonoseki, Yamaguchi Prefecture at an underwater depth of 2 m, and the adhesion of marine organisms and plants was observed so as to evaluate the antifouling performance of the paint. Table 3 shows the results.

Comparative Examples 1–5

Components were blended so as to obtain the compositions shown in Table 2. Antifouling paints were prepared and their antifouling performance was evaluated in the same way as in Example 1–5. Table 3 shows the results.

TABLE 1

| Blending Component | | Example | | | | |
|---|---|---|---|---|---|---|
| Component Type | Component Name | 1 | 2 | 3 | 4 | 5 |
| Film-forming resin | Acrylic resin *1 | 100 | 100 | 100 | 100 | 100 |
| Chain organopolysiloxane containing oxyalkylene groups | Polyether modified silicone oil (HLB: 4) *2 | — | — | — | — | 22 |
| | Polyether modified silicone oil (HLB: 10) *3 | 22 | 22 | 22 | 22 | — |
| Adhesive resin | Polybutene resin *4 | — | 34 | 31 | 39 | — |
| Antifouling agent | Triphenyltin chloride | — | — | — | 26 | — |
| Photosynthesis inhibitor | Ilgallol 1051 *5 | — | — | 6 | 15 | — |
| Organic solvent | Xylene | 285 | 364 | 371 | 471 | 285 |

(Note):
1* Dai Nippon Inki Kagaku Kogyo K.K.: "Acrydic" 56-375 (trade name)

TABLE 1-continued

| Blending Component | | Example | | | | |
|---|---|---|---|---|---|---|
| Component Type | Component Name | 1 | 2 | 3 | 4 | 5 |

*2~*3 Shin-Etsu Kagaku Kogyo K.K.
*4 Idemitsu Sekiyu Kagaku K.K.
*5 Nippon Chiba Gaigi K.K.

TABLE 2

| Blending Component | | Comparative Example | | | | |
|---|---|---|---|---|---|---|
| Component Type | Component Name | 1 | 2 | 3 | 4 | 5 |
| Film-forming | Acrylic resin *1 | 100 | 100 | 100 | 100 | 100 |
| Diorganopolysiloxane | Dimethyl silicone oil *2 | 22 | — | — | — | — |
| | Methylphenyl silicone oil *3 | — | 22 | — | — | — |
| Chain organopolysiloxane containing oxyalkylene groups | Polyether modified silicone oil (HLB: 14) *4 | — | — | 22 | — | — |
| | Polyether modified silicone oil (HLB: 0) *5 | — | — | — | 22 | — |
| Adhesive resin | Polybutene resin *6 | — | — | — | — | 39 |
| Antifouling agent | Triphenyltin chloride | — | — | — | — | 77 |
| Photosynthesis inhibitor | Ilgallol 1051 *7 | — | — | — | — | 15 |
| Organic solvent | Xylene | 285 | 285 | 285 | 285 | 539 |

(Note):
1* Dai Nippon Inki Kagaku Kogyo K.K.: "Acrydic" 56-375 (trade name)
*2~*5 Shin-Etsu Kagaku Kogyo K.K.
*6 Idemitsu Sekiyu Kagaku K.K.

TABLE 3

(The figures in the Table indicate the surface area (%) of organisms covering the filaments of the net)

| | One month | | Two months | | Three months | | Four months | | Five months | | Six months | |
|---|---|---|---|---|---|---|---|---|---|---|---|---|
| | Animal | Plant | Animal | Plant | Animal | Plant | Animal | Plant | Animal | Plant | Animal | Plant |
| Example 1 | 1 | 0 | 5 | 0 | 12 | 0 | 20 | 1 | 25 | 3 | 25 | 4 |
| Example 2 | 1> | 0 | 2 | 0 | 5 | 0 | 10 | 1 | 10 | 2 | 15 | 4 |
| Example 3 | 1> | 0 | 1.5 | 0 | 3 | 0 | 5 | 1> | 10 | 1 | 10 | 2 |
| Example 4 | 0 | 0 | 0 | 0 | 0 | 0 | 0 | 0 | 0 | 0 | 1 | 1> |
| Example 5 | 1 | 0 | 8 | 0 | 20 | 0 | 30 | 1 | 40 | 3.5 | 40 | 4 |
| Comparative Example 1 | 1 | 0 | 39 | 0 | 85 | 0 | 90 | 1 | 95 | 4 | 90 | 5 |
| Comparative Example 2 | 1.5 | 0 | 16 | 0 | 70 | 0 | 85 | 1 | 85 | 4 | 90 | 5 |
| Comparative Example 3 | 2.5 | 0 | 10 | 0 | 30 | 0 | 45 | 1 | 50 | 3 | 50 | 4 |
| Comparative Example 4 | 1 | 0 | 16 | 0 | 65 | 0 | 75 | 1 | 85 | 4 | 85 | 4 |
| Comparative Example 5 | 0 | 0 | 1> | 0 | 1 | 0 | 1> | 0 | 1 | 0 | 2 | 1> |

(Note):
Animal: Barnacles, serpulas, haily polyzoans, sea squirts, slimy sea squirts. Mainly barnacles.
Plant: Ceramium, sea lettuce, thick-haired codium The results of Table 3 show that antifouling paint of this invention is effective for marine applications, and in particular remarkably inhibits the adhesion of marine organisms to underwater structures.

What is claimed is:

1. An antifouling paint comprising:
   (A) 100 parts by weight of a film-forming resin,
   (B) 1–50 parts by weight of a chain organopolysiloxane containing oxyalkylene groups and having an HLB of 3–12, and
   (C) an adhesive resin.

2. The antifouling paint of claim 1, wherein the film-forming resin of component (A) is an acrylic resin.

3. The antifouling paint of claim 1, wherein the chain organopolysiloxane of component (B) is the one represented by general formula of $M-D_4-C_3H_6-O-(C_2H_4O)_9-H$, wherein M is a monofunctional siloxane unit containing one oxygen atom which is bonded to a silicon atom and D is a bifunctional siloxane unit containing 2 oxygen atoms which are bonded to a silicon atom.

4. The antifouling paint of claim 3, wherein the unit M is represented by the following general formula:

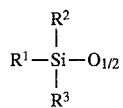

where $R^1$, $R^2$ and $R^3$ are alkyl groups.

5. The antifouling paint of claim 4, wherein $R^1$, $R^2$ and $R^3$ are methyl groups.

6. The antifouling paint of claim 3, wherein the unit D is represented by the following general formula:

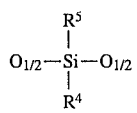

where $R^4$ and $R^5$ are alkyl, alkenyl or aryl groups.

7. The antifouling paint of claim 6, wherein $R^4$ and $R^5$ are groups selected from a group consisting of methyl, vinyl and phenyl.

8. The antifouling paint of claim 1, wherein the HLB lies within the range 4–11.

9. The antifouling paint of claim 8, wherein the HLB lies within the range 9–11.

10. The antifouling paint of claim 1, further containing (D) an antifouling agent.

11. The antifouling paint of claim 10, wherein the antifouling agent is selected from the group consisting of an organotin compound, an organozinc compound, a halogenated aromatic compound, a sulfamide compound and flakes of a fine powder of copper or cuprous oxide.

12. The antifouling paint of claim 10 further containing a photosynthesis inhibitor.

13. The antifouling paint of claim 12, wherein the photosynthesis inhibitor is a containing a triazine ring compound.

14. The antifouling paint of claim 12, further comprising at least one agent selected from the group consisting of anti-drip agents and coloring pigments.

15. The antifouling paint of claim 1, wherein the adhesive resin is a polybutene resin.

16. The antifouling paint of claim 15, wherein the adhesive resin is a random copolymer obtained by reacting isobutylene and normal butylene in butane-butylene distillate produced by decomposition of naphtha.

* * * * *